June 17, 1924.
P. RIEDELE
AUTOMOBILE BUMPER
Filed Nov. 13, 1923
1,497,880
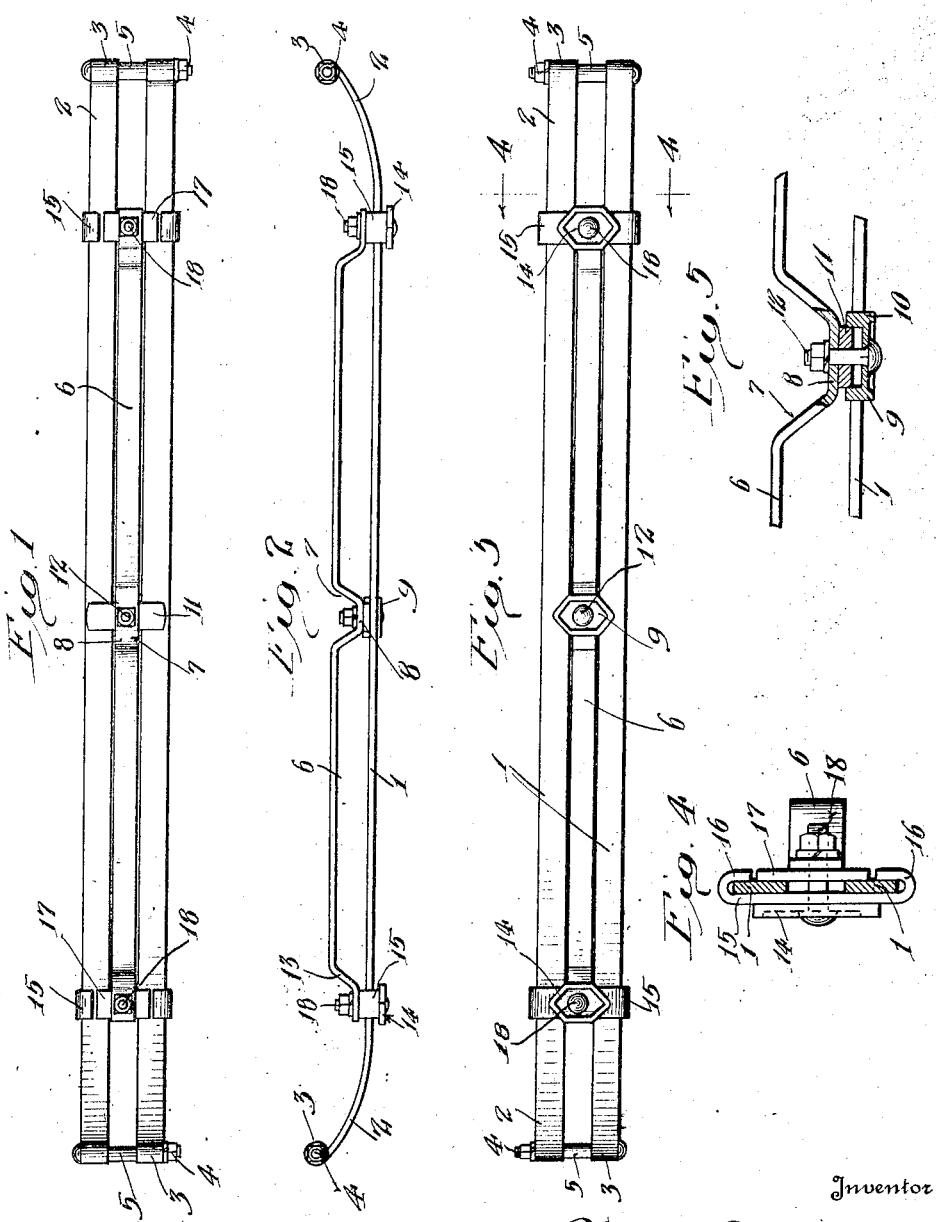
Inventor
Philip Riedele
By Lyon & Lyon
Attorneys Patented June 17, 1924.

1,497,880

UNITED STATES PATENT OFFICE.

PHILIP RIEDELE, OF LOS ANGELES, CALIFORNIA, ASSIGNOR TO UNITED STATES BUMPER COMPANY, INC., OF LOS ANGELES, CALIFORNIA, A CORPORATION OF CALIFORNIA.

AUTOMOBILE BUMPER.

Application filed November 13, 1923. Serial No. 674,460.

*To all whom it may concern:*

Be it known that I, PHILIP RIEDELE, a citizen of the United States, residing at Los Angeles, in the county of Los Angeles and State of California, have invented a new and useful Automobile Bumper, of which the following is a specification.

This invention relates to automobile bumpers of the resilient bar type, that is the type of bumpers having resilient bars of greater height than width and positioned so that the bars are adapted to flex more readily in a horizontal than in a vertical direction, and the invention refers particularly to the resilient bar type of bumper in which a plurality of vertically alined bars are employed to provide a broadened impact front.

This invention has for an object the construction of a bumper which will comprise a multiple front impact structure so reinforced and carried by a secondary impact structure positioned to the rear of the front structure, that improved impact absorbing properties are provided in the bumper and the forward impact bars are carried in a simple and effective manner.

More specifically, an object of this invention is to provide a duplex bumper front having free and flexible ends, with the corresponding ends held spaced apart and held rigidly together but adapted to freely flex, and to provide such a duplex bumper front with a supporting and reinforced impact bar joined to the front structure at three equally spaced apart points located between the freely flexing ends of the bumper.

Other objects and advantages of this invention will be readily apparent from the description of the preferred embodiment of the invention. In the accompanying drawings, I have illustrated one example of the invention in which Figure 1 is a rear elevation, Figure 2 is a plan view of Fig. 1, Figure 3 is a front elevation of the bumper, Figure 4 is a section on the line 4—4 of Fig. 3, and Figure 5 is a fragmentary view partially in longitudinal horizontal section of the central construction of the bumper.

Referring to the drawings, the bumper comprises two complementary bars 1, which are formed of a resilient material and are of greater height than width, the bars 1 being straight through the major portion of their length and then curve somewhat rearwardly at their ends, as indicated at 2, terminating in eyes 3. The complementary bars 1 are arranged horizontal in the bumper structure, parallel one to the other, spaced apart vertically and vertically alined. The corresponding eyes 3 of the complementary bars 1 are joined by bolts or pins 4, which carry spacers 5 between the bars 1. The ends 2 are thus rigidly connected together and strengthened so that they are less easily damaged.

The front structure of the bumper is carried by a resilient bar 6 disposed mainly to the rear of the bars 1 and extending in substantially the same direction as the front bars 1, said bar 6 thus providing a secondary impact member. The bar 6 is provided with a V-shaped bend 7 at its medial section which positions the bottom 8 of the bend close to the middle of the front bumper structure. 9 indicates a form of clamp for clamping the part 8 of the bar 6 to the front bars 1, said clamp comprising a plate 10, disposed in front and pressed against the upper and lower bars 1, and a second plate 11 disposed behind the bars 1 and engaging the upper and lower bar, the part 8 plates 10 and 11 being held together by a bolt 12, extending therethrough. The opposed ends 13 of the bar 6 are bent forward to position the extremities close to the front bars 1 and such bends in the bars 6 preferably do not loop around 180° or provide inturned ends, but position the ends 13, turned outward from the remainder of the bars 6. The bar 6 is constructed of shorter length than the front bars 1, so that the ends 13 are disposed a considerable distance from the eyes 3 of the front bars 1. The ends 13 are held by clamps 14 to the front bars 1. The clamps 14 comprise plates 15 abutting the front sides of the bars 1 and having hooked ends 16 extending over the top and bottom of the front structure. 17 indicates secondary plates abutting at their forward faces the rear faces of the bars 1 and abutting at their rear faces the ends 13 of the bar 6. The plates 15 and 17 and the ends 13 are bolted together by bolts 18.

By this construction, it is seen that the bumper is provided with a duplex bumper front which forms with the secondary impact bar 6 two resilient closed sections, while still providing free ends 2. The connection between the ends 13 and front bars 1 does not absolutely hook the ends in fixed position, as in the type of bumper where the secondary impact member is pivoted or bolted to the extremities of the front structure 1, but upon a severe impact applied to the front structure the clamp 14 may slide slightly along the front bars 1 towards the eyes 3 and this action will assist in overcoming and absorbing such impacts. To obtain the full advantage of this action the ends 13 should be out turned, as shown.

While the invention is disclosed in its preferred form or embodiment, it is not intended to limit the invention to the precise construction shown, but the scope of the invention is set forth in the accompanying claims.

I claim:

1. An automobile bumper comprising a plurality of vertically alined and spaced apart bars having ends curved rearwardly, the corresponding ends of the bars being rigidly connected together and held spaced apart, a secondary impact and supporting member bent forwardly at its middle and fixed to the front bars, said secondary bar being shorter than the front bars and having ends bent forwardly and attached to the front bars at points spaced from the ends thereof.

2. An automobile bumper comprising a plurality of vertically alined and spaced apart forward impact bars, said bars having their ends bent rearwardly and terminating in eyes, bolts connecting corresponding eyes of the front bars together, there being spacers on the bolts and between the alined front bars, a secondary impact and supporting bar having its central section bent V-shaped forwardly and clamped to the central part of the front structure, said secondary bar being shorter than the front bars and having its ends bent forwardly and outwardly, each end terminating a distance from the eyes of the front bars and clamped to said bars.

3. An automobile bumper composed of two parallel vertically alined and spaced apart resilient impact bars, the central portion being substantially horizontal and the ends of the bars being bent rearwardly and terminating in eyes, bolts extending through corresponding eyes of the front bars and provided with spacers between the bars, a secondary bar having a V-bend in its center, means securing the center of the secondary bar to the said front bars, said secondary bar being shorter than the front bars and having ends bent forwardly and thence again outwardly, and clamps securing the ends to the front impact bars.

4. An automobile bumper comprising a plurality of front bars vertically aligned and spaced apart, the ends of the bars being provided with eyes, bolts connecting corresponding eyes of the front bars, spacers between the eyes, a second bar bent forward at its ends and middle, the ends being bent outwardly and spaced from the ends of the front bars, spacer clamps securing the middle and ends of the secondary bar to the front bars.

Signed at Los Angeles, California, this 6th day of November, 1923.

PHILIP RIEDELE.